(12) United States Patent
Nessel et al.

(10) Patent No.: US 7,272,873 B2
(45) Date of Patent: *Sep. 25, 2007

(54) SILL PLATE RETAINER

(75) Inventors: Rosalind Nessel, Birmingham, MI (US); Steven M Benedetti, Sterling Heights, MI (US)

(73) Assignee: Newfrey LLC, Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/858,497

(22) Filed: Jun. 1, 2004

(65) Prior Publication Data

US 2004/0244160 A1 Dec. 9, 2004
US 2007/0000102 A9 Jan. 4, 2007

Related U.S. Application Data

(63) Continuation-in-part of application No. 10/842,355, filed on May 10, 2004, now Pat. No. 7,179,013, and a continuation-in-part of application No. 10/829,103, filed on Apr. 21, 2004, now Pat. No. 7,186,051.

(60) Provisional application No. 60/476,745, filed on Jun. 6, 2003, provisional application No. 60/474,833, filed on May 30, 2003, provisional application No. 60/469,438, filed on May 9, 2003.

(51) Int. Cl.
   *F16B 21/09* (2006.01)
(52) U.S. Cl. ........................................... 24/297
(58) Field of Classification Search ............... 24/297, 24/453, 702, 669; 411/508–510; 296/146.7, 296/39.1; 403/252, 331, 315–317, 353, 279; 52/716.5–716.7; 248/73, 222.12

See application file for complete search history.

(56) References Cited

U.S. PATENT DOCUMENTS

| | | | |
|---|---|---|---|
| 2,815,554 A | * | 12/1957 | Pieper ........................ 24/528 |
| 3,018,529 A | | 1/1962 | Perrochat |
| 3,029,486 A | | 4/1962 | Raymond |
| 3,183,030 A | * | 5/1965 | Schlueter .................... 292/303 |
| 3,703,747 A | | 11/1972 | Hamman |
| 3,810,279 A | | 5/1974 | Swick et al. |
| 3,988,808 A | | 11/1976 | Poe et al. |
| 4,176,428 A | | 12/1979 | Kimura |
| 4,261,243 A | | 4/1981 | Palmer |
| 4,363,160 A | | 12/1982 | Wibrow |
| 4,505,611 A | | 3/1985 | Nagashima et al. |
| 4,517,711 A | | 5/1985 | Tanaka |
| D293,883 S | | 1/1988 | Hirohata |
| 4,716,633 A | | 1/1988 | Rizo |
| 4,750,878 A | | 6/1988 | Nix et al. |
| 4,810,147 A | | 3/1989 | Hirohata |

(Continued)

FOREIGN PATENT DOCUMENTS

| | | |
|---|---|---|
| EP | 1 059 461 | 12/2000 |
| FR | 84 950 | 5/1995 |
| FR | 2 748 300 | 11/1997 |
| GB | 1 065 914 | 4/1967 |
| GB | 2 316 707 A | 3/1998 |
| JP | 11125224 A * | 5/1999 |
| WO | WO9911154 A1 * | 3/1999 |

*Primary Examiner*—James R Brittain
(74) *Attorney, Agent, or Firm*—Harness, Dickey & Pierce, P.L.C.

(57) ABSTRACT

A resilient clip is provided for engaging a dog house coupling feature of a trim component. The resilient clip has a mating member for engaging a hole defined in a body panel. The resilient clip includes a triangular mating feature that is positioned relative to the coupling region. The triangular mating feature contacts at least one surface of the dog house structure to minimize rotation of the resilient clip with respect the to the dog house. This reduces rotation of the resilient clip with respect to the hole defined in the body panel.

29 Claims, 4 Drawing Sheets

U.S. PATENT DOCUMENTS

| | | |
|---|---|---|
| 4,861,208 A | 8/1989 | Boundy |
| 4,867,599 A | 9/1989 | Sasajima |
| 4,874,276 A | 10/1989 | Iguchi |
| 4,927,287 A | 5/1990 | Ohkawa et al. |
| 4,932,105 A * | 6/1990 | Muller ............... 24/666 |
| 5,168,604 A * | 12/1992 | Boville ............... 24/297 |
| 5,195,793 A * | 3/1993 | Maki ............... 293/155 |
| 5,339,491 A | 8/1994 | Sims |
| 5,448,809 A | 9/1995 | Kraus |
| 5,494,392 A | 2/1996 | Vogel et al. |
| 5,507,610 A | 4/1996 | Benedetti et al. |
| 5,531,499 A * | 7/1996 | Vecchio et al. ......... 296/146.7 |
| 5,542,158 A | 8/1996 | Gronau et al. |
| 5,592,719 A | 1/1997 | Eto et al. |
| 5,704,753 A | 1/1998 | Ueno |
| 5,850,676 A | 12/1998 | Takahashi et al. |
| 6,049,952 A | 4/2000 | Mihelich et al. |
| 6,253,423 B1 * | 7/2001 | Friedrich et al. ............ 24/293 |
| 6,322,126 B1 | 11/2001 | Kraus |
| 6,371,550 B2 * | 4/2002 | Iwatsuki et al. ............ 296/152 |
| 6,438,804 B1 | 8/2002 | Romero Magarino |
| 6,453,522 B1 | 9/2002 | Romero Magarino et al. |
| 6,474,921 B1 | 11/2002 | Gordon |
| 6,514,023 B2 | 2/2003 | Moerke |
| 6,644,902 B1 | 11/2003 | Cutshall |
| 6,648,542 B2 | 11/2003 | Smith et al. |
| 6,669,274 B2 * | 12/2003 | Barnard et al. ......... 296/193.1 |
| 6,715,185 B2 * | 4/2004 | Angellotti ............ 24/297 |
| 2002/0043041 A1 * | 4/2002 | Yoyasu ............... 52/716.5 |
| 2003/0000048 A1 | 1/2003 | Boville |
| 2003/0159256 A1 * | 8/2003 | Clarke ............... 24/297 |
| 2004/0047705 A1 | 3/2004 | Cutshall |
| 2004/0223805 A1 * | 11/2004 | Benedetti et al. ........... 403/316 |
| 2004/0240932 A1 * | 12/2004 | Benedetti ............... 403/315 |
| 2005/0034282 A1 | 2/2005 | Kurily et al. |

* cited by examiner

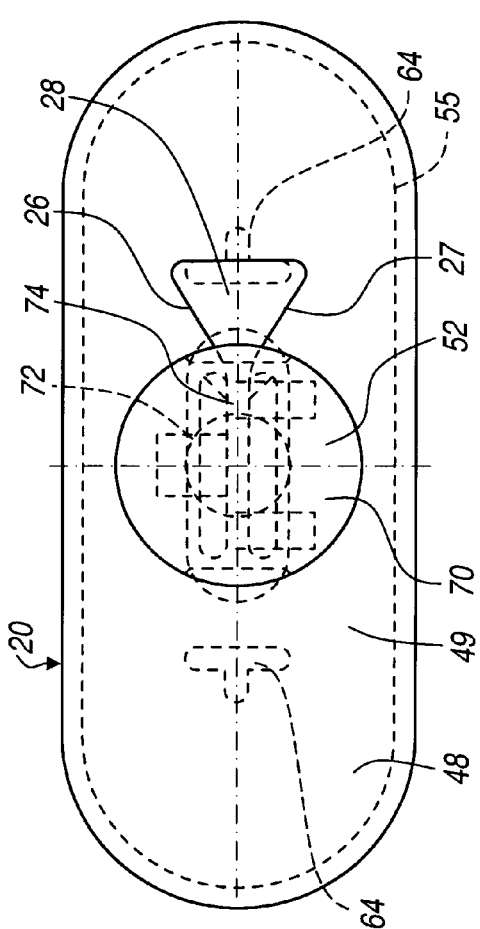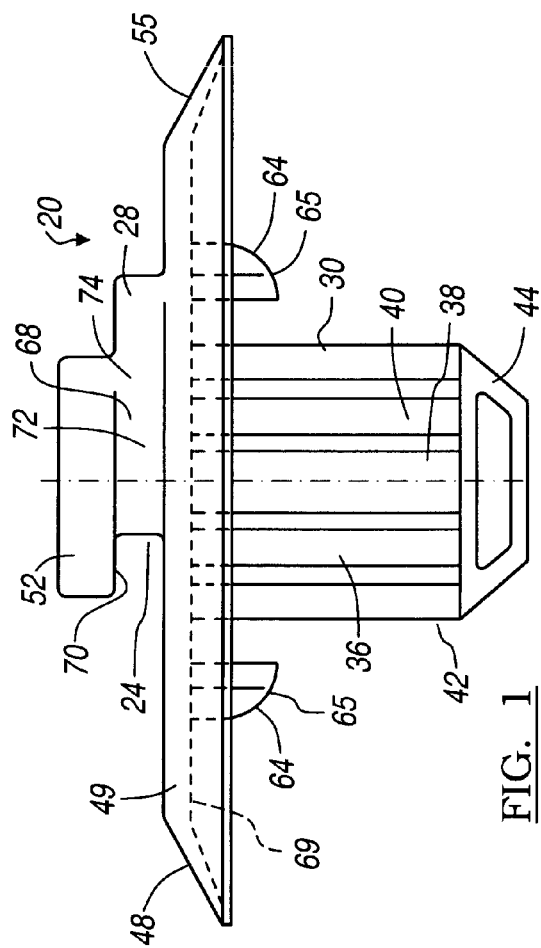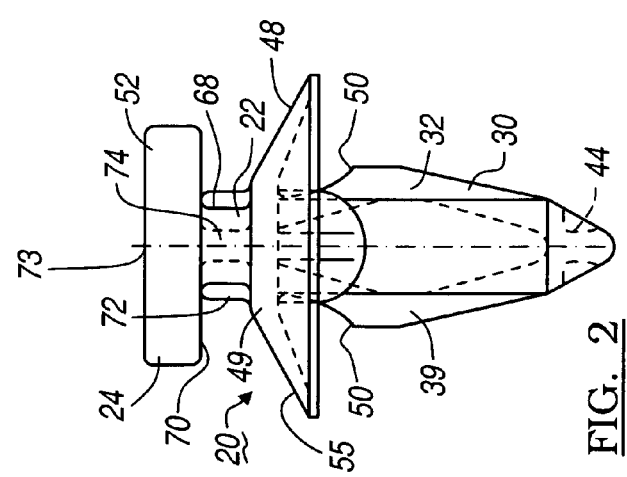

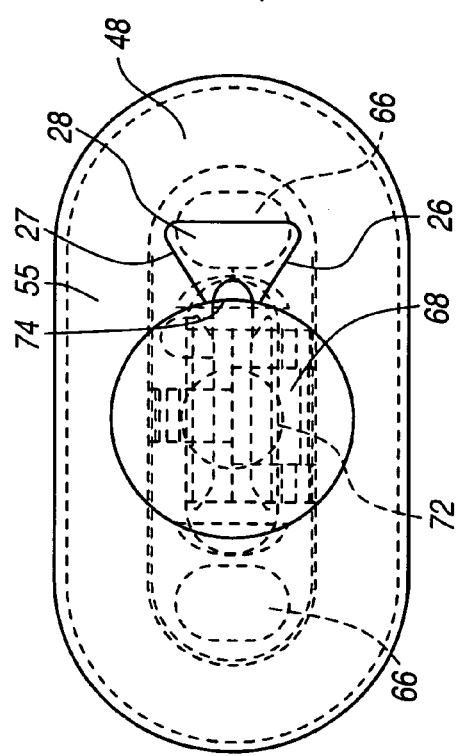
FIG. 6
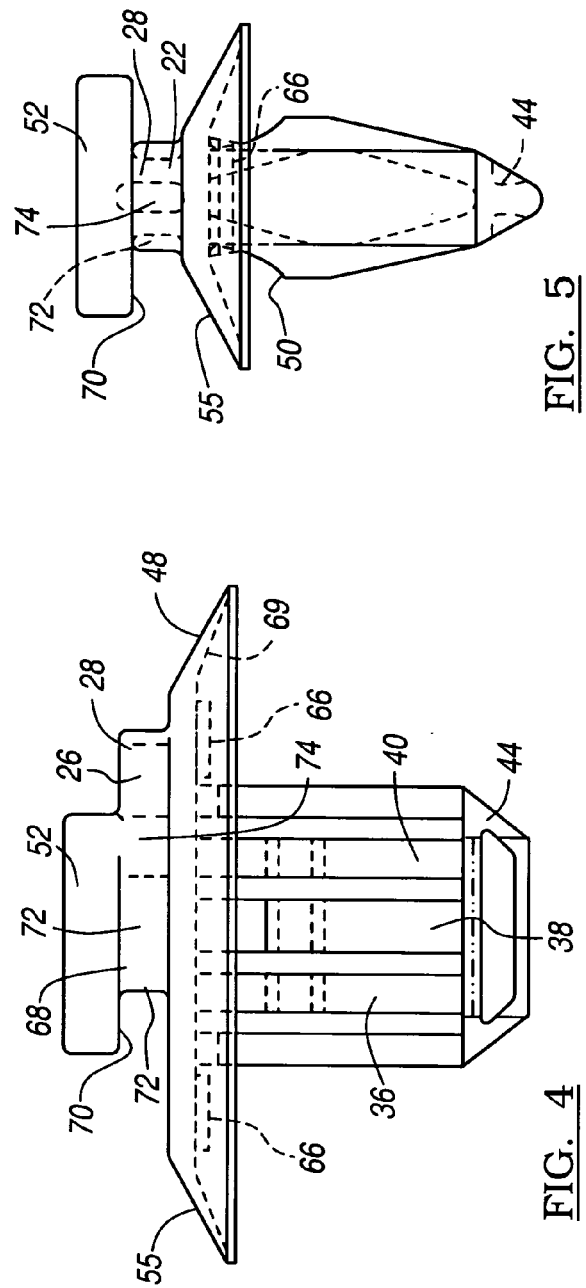
FIG. 5
FIG. 4

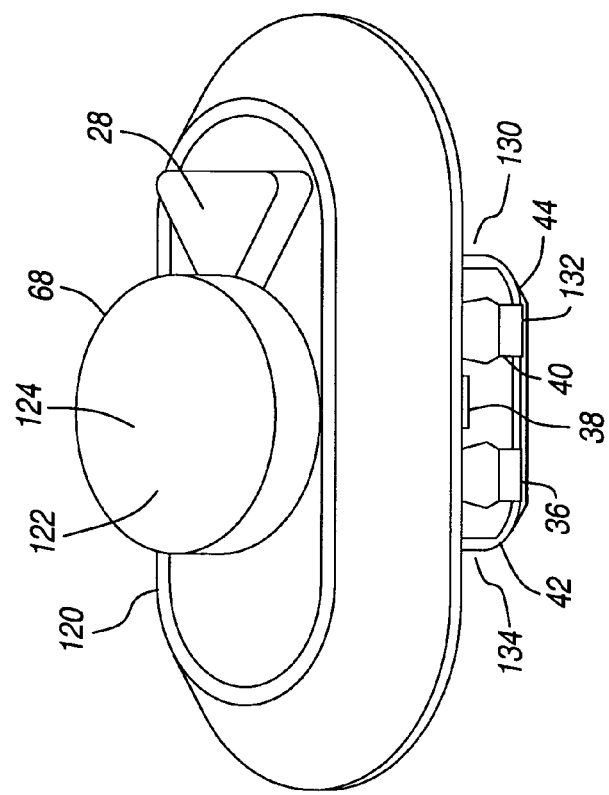
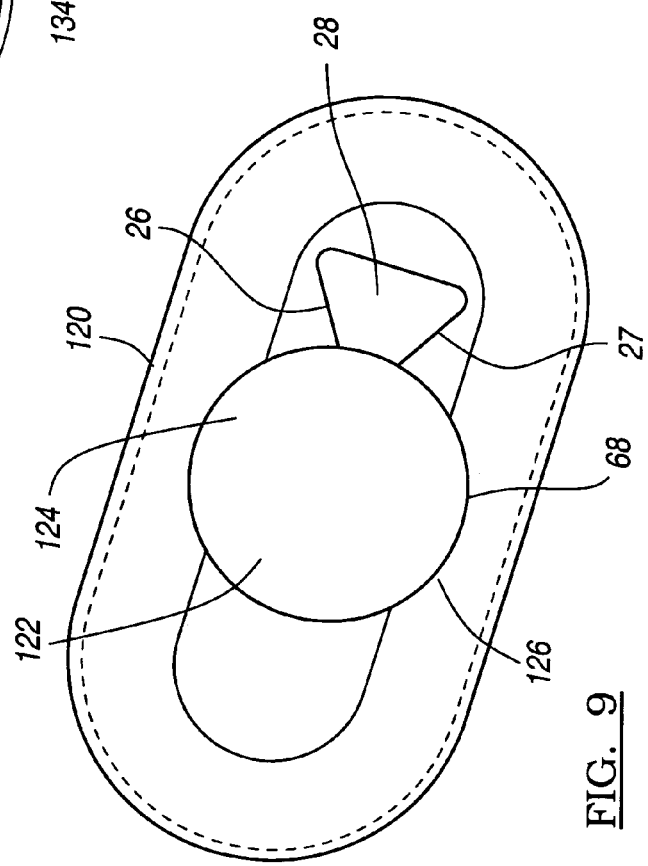

SILL PLATE RETAINER

CROSS-REFERENCE TO RELATED APPLICATIONS

This application claims the benefit of U.S. Provisional Application No. 60/476,745, filed on Jun. 6, 2003. The disclosure of U.S. Provisional Application No. 60/476,745 is incorporated herein by reference. The present application is a continuation-in-part application of prior U.S. patent application Ser. No. 10/829,103, filed Apr. 21, 2004, now U.S. Pat. No. 7,186,051 which claims the benefit of U.S. Provisional Application No. 60/469,438, filed May 9, 2003. The present application is also a continuation-in-part application of prior U.S. patent application Ser. No. 10/842,355, filed May 10, 2004, now U.S. Pat. No. 7,179,013 which claims the benefit of U.S. Provisional Application No. 60/474,833, filed May 30, 2003.

TECHNICAL FIELD

The present invention relates generally to resilient clip fasteners and more particularly to a resilient clip fastener to secure the body portion of the resilient clip to a structure. More specifically, the present invention relates to a resilient clip fastener having a construction that utilizes a plastic body portion which has a mating portion configures to couple to a dog house attachment feature of a trim component.

BACKGROUND OF THE INVENTION

Many current vehicles employ resilient clips to secure various components to the vehicle body. One such application concerns interior panels that mount to the interior of the vehicle such as on the sill plate moldings. Such panels serve not only to provide occupants with a convenient point to step during ingress to and egress from the vehicle, but also provide sealing capabilities for intrusion of water, dust, and noise.

During assembly of the vehicle, it is conventional procedure to install the sill plate panels from the exterior of the vehicle as it is moving down the assembly line. This operation is common whether the vehicle is a 2 door or 4 door passenger car.

In order to accomplish this assembly task, the sill plate assembly is typically equipped with numerous fasteners, located along the length of the sill plate panel assembly. The fasteners are adapted to penetrate through corresponding holes located in the reinforcing sheet metal members of the vehicle interior. It is the responsibility of the line operators to properly orient the panel assembly adjacent the interior of the vehicle and press the fasteners into the various mounting holes in the reinforcing sheet metal members to secure the panel assembly to the interior of the vehicle.

For aesthetic reasons, the panel fasteners are typically secured in some fashion to the backside of the panel so that they are not visible from the interior of the vehicle after the panel assembly is installed. Consequently, it is often incumbent upon the line operators to blindly "feel" for the location of the mounting holes with their fingers before pressing the fasteners into the holes from the opposite show-surface side of the panel.

Due to slight misalignments, which can occur between the fasteners and their corresponding mounting holes, some of the fasteners may not be properly seated and secured to the sheet metal. These seating problems often arise from the rotation of the fastener with respect to a rectangular hole, which essentially prevents the easy fastening of the trim component to the body.

Accordingly, there remains a need in the art for an improved fastener having a relatively low installation force and a relatively high removal force that is relatively more tolerant of misalignment problems. Ideally, the fastener should be inexpensive to manufacture, reliable and simple to install. Furthermore, the fastener should be particularly adapted for securing structures to one another in a manner, which minimizes vibration, and the concomitant noise problems that are often associated with such fasteners.

SUMMARY OF THE INVENTION

In one preferred form, the present invention provides a resilient clip for engaging a dog house coupling feature of a trim component and a mating member for engaging a hole defined in a body panel. The resilient clip includes a body portion having a coupling region, and a triangular mating feature that is positioned relative to the coupling region. The triangular mating feature contacts at least one surface of the dog house structure to prevent rotation of the resilient clip with respect the to the dog house. This reduces rotation of the resilient clip with respect to the hole defined in the body panel. The mating member has a pair of fastening members configured to engage the sides of the mounting hole.

BRIEF DESCRIPTION OF THE DRAWINGS

Additional advantages and features of the present invention will become apparent from the subsequent description and the appended claims, taken in conjunction with the accompanying drawings, wherein:

FIG. 1 is a front view of a fastener constructed in accordance with the teachings of the present invention;

FIG. 2 is a side view of the fastener of FIG. 1;

FIG. 3 is a top view the fastener of FIG. 1 illustrating the spacing of the structures in greater detail;

FIG. 4 is a front view of a fastener constructed in accordance with the teachings of an alternate embodiment of the present invention;

FIG. 5 is a side view of the fastener of FIG. 5;

FIG. 6 is a top view of the fastener of FIG. 5 illustrating the spacing of the structures in greater detail;

FIG. 8 represents a perspective view of an alternate fastener according to the teaching of the present invention; and FIG. 9 represents a top view of the fastener shown in FIG. 8.

DETAILED DESCRIPTION OF THE PREFERRED EMBODIMENT

Figure 7:
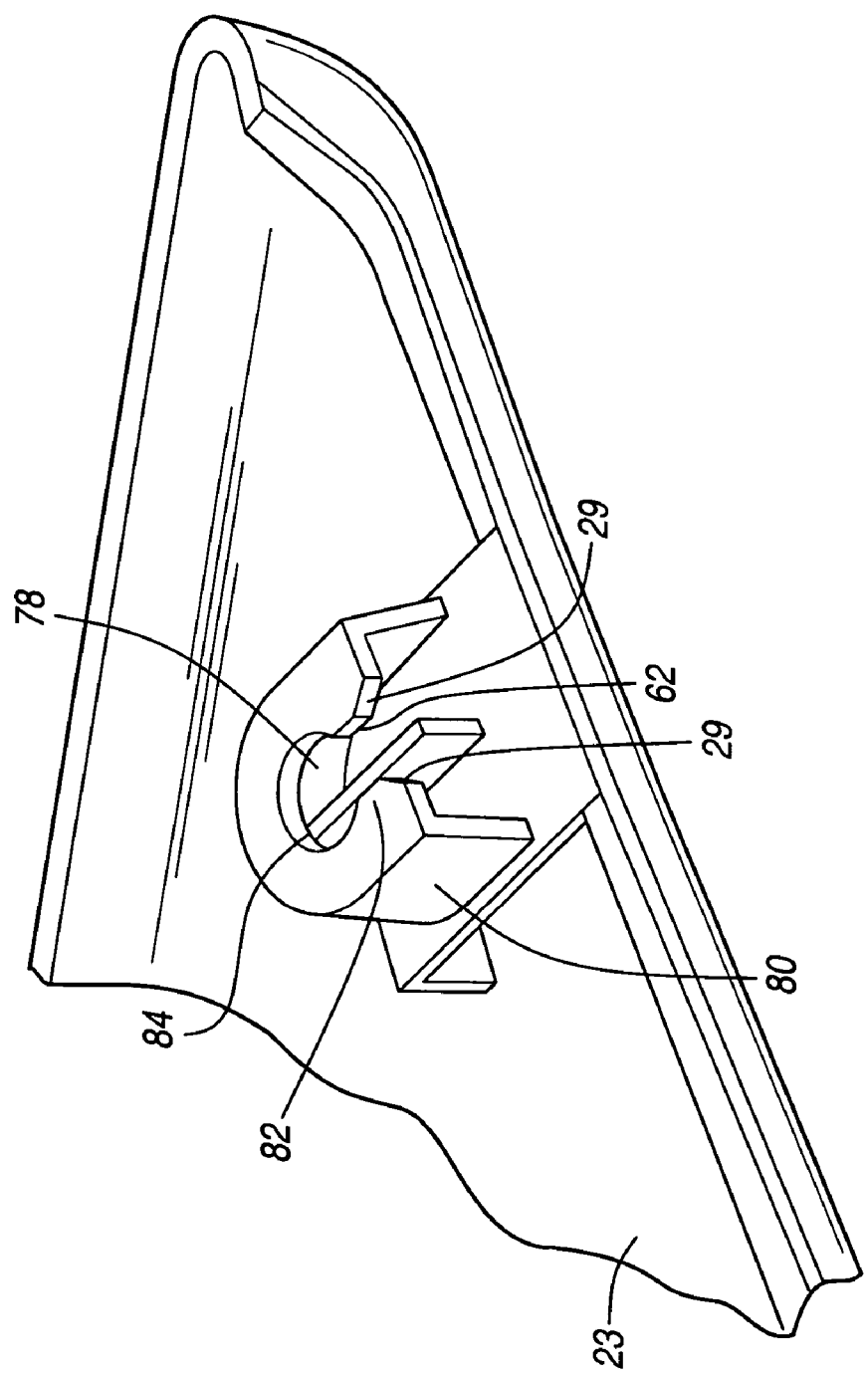
FIG. 7 is a perspective view of a trim component having a dog house attachment feature configured to engage the fastener according to the teachings of the present invention.

Referring to FIGS. 1 through 6, a fastener 20 in accordance with the present invention is disclosed. The fastener 20 is defined by a plastic body portion 22 which engages a trim component 23 having a dog house engagement portion 24. Integral with the dog house engagement portion 24 are a pair of engagement surfaces 26 and 27 disposed on abutting flange 28 which are used to engage the mating surfaces 29 of the dog house engagement portion 24. Additionally, the body portion 22 has a mating portion 30 which is formed by two sets 32 and 34 of three locking members 36, 38, 40. The two sets 32 and 34 of three locking members 36, 38, 40 are coupled together at a proximal end 42 by an angled or wedge-shaped member 44. The two sets 32 and 34 of three locking members 36, 38, 40 are coupled together at a distal end 46 by a sealing umbrella portion 48. Each of the three locking members 36, 38, 40 define retaining snap in teeth 50 which facilitate the coupling of the plastic body portion 22 to a sheet metal structure 51.

The umbrella portion 48 functions to seal the mounting hole 53 in the sheet metal structure 51 and is formed of an oval planar portion 49 which is surrounded by a generally oval deformable portion 55. The teeth 50 are configured to pull the deformable oval portion onto the sheet metal 51. Coupled to the distal end 46 and disposed on the sealing umbrella portion 48 is a retaining flange 52 of the dog house engagement portion 24 which functions to laterally bind the fastener 22 to the dog house.

Generally, the abutting flange 28 of the dog house engagement portion 24 is defined by the sides of triangular abutting flange member 28. The triangular abutting flange member 28 is defined by the pair of planar engaging surfaces 26 and 27. The planar engaging surfaces 26 and 27 are configured to engage or contact the triangular insertion slot 62 defined in the dog house that facilitates the insertion of the dog house engagement portion 24 into the dog house.

Disposed on the lower surface of the umbrella region is a pair of engagement members 64 and 66. The engagement members 64 are generally perpendicular to the lower surface 69 of the sealing umbrella portion 48. Optionally, these engagement members 64 can engage apertures formed in the sheet metal structure in order to prevent rotation of the fastener with respect to the sheet metal structure. FIGS. 1-3 depict a t-shaped engagement member 64 which has a rounded surface 65 which abut the surface of the aperture in the sheet metal structure. FIGS. 4-6 depict oval engagement members 66. The engagement members 66 function to stand the engagement plastic fastener 20 a predetermined distance from the body panel surface.

Referring generally to FIGS. 1 and 4, is a view of dog house engagement portion 24 coupled to the plastic body portion 22. The dog house engagement portion 24 has a generally cylindrical-shaped member 68 and has the retaining flange 52. The retaining flange 52 has a surface 70 which engages an interior surface of the dog house of the trim component. The generally cylindrical-shaped member 68 has a circular outer surface 72 which functions to guide the engagement portion between the angled insertion surfaces of the dog house. The circular outer surface 72 further functions to mate with a circular aperture defined within the dog house and prevent its lateral removal. The location of the circular outer surface 72 is defined by the cylindrical portion centerline 73. The dog house engagement portion 24 includes a connecting flange 74 that is configured to rigidly connect the triangular flange member 28 to the cylindrical coupling member 72.

As can be seen in FIG. 7, the dog house 80 defines an upper keyhole slot 76 which allows displacement of the dog house retention members 82. The dog house defines a circular aperture 84 having a diameter slightly larger than the diameter of cylindrical-shaped member 68. The triangular insertion slot 62 is defined between the mating surfaces 29 of the dog house 80. Either engagement surfaces 26 and 27 may contact one of the mating surfaces 29. This minimizes rotation and translation of the fastener 20.

As shown in FIGS. 8 and 9, the fastener 120 in accordance with another embodiment of the present invention is disclosed. The fastener 120 is defined by a plastic body portion 122 having a dog house engagement portion 124. Integral with the dog house engagement portion 124 are pairs engagement surface 26 and 27 disposed on abutting flange 28 which are used to engage a surface of the dog house engagement portion 124. Additionally, the body portion 122 has a locking portion 130 which is formed by two sets 132 and 134 of three locking members 36, 38, 40. The two sets 132 and 134 of three locking members 36, 38, 40 are coupled together at a proximal end 42 by an angled or wedge-shaped member 44. The two sets 32 and 34 of three locking members 36, 38, 40 are coupled together at a distal end 46 by a sealing umbrella portion 48. Each of the three locking members 36, 38, 40 define retaining snap in teeth 50 which facilitate the coupling of the plastic body portion 22 to a sheet metal structure 51. The dog house engagement portion 124 is a cylindrical body 126 without a capping flange 52.

The foregoing discussion discloses and describes exemplary embodiments of the present invention. One skilled in the art will readily recognize from such a discussion, and from the accompanying drawings and claims that various changes, modifications, and variations can be made therein without departing from the spirit and scope of the invention.

What is claimed is:

1. A fastener for coupling a component having a dog house engagement feature to a sheet metal aperture defined by a sheet of metal comprising:
 a body portion having a locking portion configured to be mated with the sheet metal aperture, said body portion having a dog house engagement portion;
 the dog house engagement portion defining a triangular engagement flange coupled to the body portion, the dog house engagement portion defining a cylindrical portion having a cylindrical portion centerline, the cylindrical portion operable for insertion into a circular dog house aperture defined by the dog house, the engagement flange being configured to follow the cylindrical portion and protrude from the circular doghouse aperture to contact an engagement surface defined on the dog house so as to minimize rotation of the body portion with respect to the dog house, said engagement surface adjoining the doghouse aperture, wherein the triangular engagement flange defining at least one surface being parallel to the cylindrical portion centerline.

2. The fastener according to claim 1 wherein the body portion comprises an umbrella member coupled to the dog house engagement portion, the umbrella member being configured to fluidly seal the sheet metal aperture.

3. The fastener according to claim 1 wherein the locking portion comprises a plurality of deformable members, each member defining a tooth configured to engage the sheet metal aperture.

4. The fastener according to claim 3 wherein the deformable members are coupled to an umbrella member.

5. The fastener according to claim 3 wherein the deformable members are coupled to a wedged-shaped portion.

6. The fastener according to claim 1 wherein the engagement flange is configured to couple with a triangular insertion slot defined by the dog house.

7. The fastener according to claim 1, further comprising a coupling flange disposed between the cylindrical portion and the triangular engagement flange.

8. The fastener according to claim 1 wherein the dog house engagement portion is coupled to an umbrella portion.

9. The fastener according to claim 8 wherein the umbrella portion defines a generally oval base and an oval deformable portion.

10. The fastener according to claim 1 wherein the body portion comprises a support member configured to limit the insertion of the fastener into the dog house aperture.

11. A fastener for coupling a flanged component to a sheet metal aperture defined by a sheet of metal comprising:
   a body portion having a locking portion configured to be mated with the sheet metal aperture, said body portion having a dog house engagement portion;
   the dog house engagement portion comprising a cylindrical portion, having a cylindrical portion centerline, said cylindrical portion operable to couple with a circular dog house aperture defined by a dog house, a triangular engagement member coupled to the body portion, said triangular engagement member having a pair of engagement surfaces which are parallel to the cylindrical portion centerline, at least one of the engagement surfaces is configured to protrude from the dog house aperture to contact a surface of the dog house so as to minimize rotation of the body portion with respect to the dog house, said surface of the dog house adjoining the dog house aperture.

12. The fastener according to claim 11 wherein the body portion comprises an umbrella member coupled to the dog house engagement portion, the umbrella member being configured to fluidly seal the sheet metal aperture.

13. The fastener according to claim 11 wherein the locking portion comprises a plurality of deformable members, each member defining a tooth configured to engage the sheet metal aperture.

14. The fastener according to claim 13 wherein the deformable members are coupled to an umbrella member.

15. The fastener according to claim 13 wherein the deformable members are coupled to a wedged-shaped portion.

16. The fastener according to claim 11 wherein the engagement surfaces are configured to couple with a triangular insertion slot defined in a dog house.

17. The fastener according to claim 11 wherein the dog house engagement portion is coupled to an umbrella portion.

18. The fastener according to claim 17 wherein the umbrella defines a generally oval base and an oval deformable portion.

19. The fastener according to claim 11 wherein the locking portion is a wedge-shaped member defining a plurality of deformable flanges.

20. The fastener according to claim 11 wherein the body portion comprises a support member configured to limit the insertion of the fastener into the sheet metal aperture.

21. A fastener for coupling a component having a dog house engagement feature to a sheet metal aperture defined by a sheet of metal comprising:
   a body portion having a locking portion configured to be mated with the sheet metal aperture, said body portion having a dog house engagement portion, the body portion comprises an umbrella member configured to be coupled to a dog house engagement portion, the umbrella member being configured to fluidly seal the sheet metal aperture;
   wherein the dog house engagement portion comprising a cylindrical portion operable to couple with a circular dog house aperture defined by the dog house, said cylindrical portion having a cylindrical portion centerline, a triangular engagement member coupled to the body portion, having a pair of engagement surfaces, each of said engagement surfaces being parallel to the cylindrical portion centerline, at least one of the engagement surfaces is configured to protrude from the dog house aperture to contact a surface of the dog house so as to minimize rotation of the body portion with respect to the dog house, said surface of the dog house adjoining the doghouse aperture.

22. The fastener according to claim 21 wherein the locking portion comprises a plurality of deformable members, each member defining a tooth configured to engage the sheet metal aperture.

23. The fastener according to claim 22 wherein the deformable members are coupled to the umbrella member.

24. An assembly for coupling a component to a sheet metal aperture defined in a sheet of metal comprising:
   a dog house defining a cylindrical aperture and a pair of angled insertion surfaces;
   a body portion having a locking portion configured to be mated with the sheet metal aperture, said body portion having a dog house engagement portion;
   the dog house engagement portion defining an engagement flange coupled to the body portion, the dog house engagement portion defining a cylindrical portion, the cylindrical portion disposed within the circular aperture, the engagement flange protruding from the circular doghouse aperture and in contact with the angled insertion surfaces so as to minimize rotation of the body portion with respect to the dog house, wherein the locking portion comprises a plurality of deformable members, each member defining a tooth configured to engage the sheet metal aperture.

25. The assembly according to claim 24 wherein the body portion comprises an umbrella member coupled to the dog house engagement portion, the umbrella member being configured to fluidly seal the sheet metal aperture.

26. The assembly according to claim 24 wherein the deformable members are coupled to an umbrella member.

27. The assembly according to claim 24 wherein the deformable members are coupled to a wedged-shaped portion.

28. The assembly according to claim 24 wherein the engagement flange engages a triangular insertion slot defined by the pair of angled insertion surfaces.

29. The assembly according to claim 28 wherein the engagement flange is a triangular flange.

* * * * *